UNITED STATES PATENT OFFICE.

WALTER G. PERKINS AND THOMAS COX, JR., OF SAN FRANCISCO, CALIFORNIA.

PROCESS OF AGGLOMERATING MINERALS.

No. 852,611.　　　Specification of Letters Patent.　　　Patented May 7, 1907.

Application filed December 29, 1905. Serial No. 293,848.

*To all whom it may concern:*

Be it known that we, WALTER G. PERKINS, a subject of the King of Great Britain, and THOMAS COX, Jr., a citizen of the United States, residing in San Francisco, in the county of San Francisco and State of California, have invented certain new and useful Improvements in Processes of Agglomerating Minerals, of which the following is a specification.

Our invention relates to the process of agglomerating certain elements or ores into a complete or partial solid mass by the application of heat, as an inflammable gas, and an air current.

In the treatment of certain metalliferous ores or compounds it has been discovered that by mixing or commingling them in a suitable vessel and applying heat from an external source until the temperature of the mass has been raised to a certain degree and then providing a supply of oxygen, as by an air blast, the process of combustion of certain ingredients of the mass will continue until the proper chemical combinations and reactions have taken place to release or transform the objectionable elements, and then to gradually agglomerate or sinter the entire mass so that it can be subsequently treated for releasing and securing the metallic portions, preferably by smelting.

Heretofore it has generally been the practice to apply the initial or external heat by a heated or combustible material placed in the vessel with, or prior to the charge, but such processes require the application of a new or fresh supply of fuel to or with each and every charge that is placed in the vessel or receptacle within which the process is carried forward, in some cases the vessel being of a peculiar construction to facilitate the process. But in the practice of our invention we first mix or commingle in a suitable vessel, the ingredients or ores which we wish to treat which are preferably in the form of oxids, sulfids, sulfates, carbonates and silicates, either as raw material or as products, by products, etc., obtained during the reduction processes, as smelting, concentrating, etc. and then apply heat from an external source, preferably in the form of an ignited inflammable gas, with or without its being mixed with air or steam, and under more or less pressure.

The gas is generated in any suitable manner and conveyed to the commingled mass of ingredients as above indicated, which will also include the products and by-products formed during the process, and there ignited and caused to permeate the mass until the heat generated thereby is sufficient to cause the oxygen of the incoming air to combine with certain of the ingredients, as sulfur, and thereby continue generation of heat without the gas, to cause the mass to become fused together or agglomerated to form a sinter which can be then treated in any desired manner, preferably by smelting in blast furnace.

During the process, the introduction of the gas can and may be varied or controlled so that at first the full or greatest amount required and employed can be used which is gradually decreased when the latent heat of the mass begins to be liberated by the chemical reactions. The air so introduced with or without the gas can be warmed or heated to any desired degree before its introduction into the mass and it may have the gas mixed or commingled therewith during its introduction or the air and gas may be introduced separately.

By means of our process it is evident that the charging of the pots can be done at any time and in any desired manner and when it is desired to treat the material, the gas may be ignited and admitted to the mass and then regulated to suit the conditions thereof simultaneously with the admission of the air to perfect the agglomeration, the admission of the air being preferably increased with the decrease of the amount of gas introduced after the generation of the heat from the burning material has commenced.

The use of gas as a fuel is more convenient and economical than solid fuel, and the supply being unlimited, the initial heat can be continued until the desired degree of heat is obtained to start the continuous or subsequent combustion, which could not be done where an insufficient amount of solid fuel is used with the older processes, and where there is an insufficient amount of the element that supports the later combustion, as sulfur, the introduction of the desired amount of heat from the gas may be continued during the entire process, whereas with solid fuel the treatment of such ores or materials would be an impossibility. And the supply being controllable, it also prevents the heat becoming so excessive as to produce fusion of the mass, which can not be prevented where an excess of solid fuel is used. Still another advantage arising from the use of gaseous fuel is that it avoids the introduction into the charge of foreign or objectionable material, as the ash or other silicious material, which must be subsequently removed or treated, as by fluxing, as must be done when solid fuel, as wood or coal, is used.

Having described our invention, what we claim as new and desire to secure by Letters Patent, is—

1. The process of agglomerating certain metalliferous ores containing a material having fuel properties, which consists in placing the same within a receptacle, then applying heat thereto from an ignited inflammable gaseous material, then introducing air thereto, and then regulating the supply of gas and air until the mass has become agglomerated.

2. The process of agglomerating certain elements in the form of oxids, sulfids, sulfates, carbonates and silicates, which consists in commingling said elements in a receptacle, then applying heat thereto from an ignited inflammable gas, then introducing air, and then regulating the supply of gas and air until the mass has become agglomerated.

3. The process of agglomerating certain elements in the form of oxids, sulfates, sulfids, carbonates and silicates, which consists in commingling said elements in a receptacle, then applying heat thereto from an ignited inflammable gas until heat is generated from the combustion of a portion of said elements, then decreasing the heat from the gas, and then introducing air to complete the agglomeration of said mass.

In testimony whereof we have affixed our signatures, in presence of two witnesses, this twenty-second day of December 1905.

WALTER G. PERKINS.
THOMAS COX, Jr.

Witnesses:
M. R. SEELY,
B. L. QUAYLE.